(12) United States Patent
Curliss et al.

(10) Patent No.: US 7,041,778 B1
(45) Date of Patent: May 9, 2006

(54) PROCESSABLE THERMALLY STABLE ADDITION POLYIMIDE FOR COMPOSITE APPLICATIONS

(75) Inventors: David B. Curliss, Beavercreek, OH (US); Jason E. Lincoln, Englewood, OH (US); Katie E. Thorp, Tipp City, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/849,634

(22) Filed: May 18, 2004

Related U.S. Application Data

(60) Provisional application No. 60/477,034, filed on Jun. 5, 2003.

(51) Int. Cl.
*C08G 73/10* (2006.01)

(52) U.S. Cl. .............. 528/353; 528/125; 528/126; 528/128; 528/172; 528/173; 528/174; 528/176; 528/182; 528/183; 528/188; 528/220; 528/229; 528/350; 528/351

(58) Field of Classification Search .............. 528/170, 528/125, 126, 128, 172–174, 176, 179, 183, 528/185, 220, 229, 350, 357, 352, 353
See application file for complete search history.

(56) References Cited

U.S. PATENT DOCUMENTS

| | | | | | |
|---|---|---|---|---|---|
| 4,485,231 | A | * | 11/1984 | Landis | 528/125 |
| 5,138,028 | A | * | 8/1992 | Paul et al. | 528/353 |
| 5,171,828 | A | * | 12/1992 | Meterko et al. | 528/353 |
| 5,175,241 | A | * | 12/1992 | Darrow | 528/353 |
| 5,196,500 | A | * | 3/1993 | Kreuz et al. | 528/125 |
| 5,412,066 | A | | 5/1995 | Hergenrother et al. | |
| 5,426,234 | A | | 6/1995 | Bryant et al. | |
| 5,567,800 | A | | 10/1996 | Hergenrother et al. | |
| 5,681,967 | A | | 10/1997 | Hergenrother et al. | |
| 6,127,509 | A | | 10/2000 | Pratte et al. | |

* cited by examiner

*Primary Examiner*—P. Hampton Hightower
(74) *Attorney, Agent, or Firm*—AFMCLO/JAZ; Bart S. Hersko

(57) ABSTRACT

A novel polyimide resin consisting essentially of 3,3',4,4'-benzophenonetetracarboxylic dianhydride (BTDA), 3,4,3',4'-biphenyltetracarboxylic dianhydride (BPDA), 2,2 bis (3',4'-dicarboxy phenyl) hexafluoro propane dianhydride (6FDA), 2-(3,4-dicarboxyphenyl)-1-phenylacetylene anhydride (4-PEPA) and an aromatic diamine.

2 Claims, No Drawings

PROCESSABLE THERMALLY STABLE ADDITION POLYIMIDE FOR COMPOSITE APPLICATIONS

CROSS REFERENCE TO RELATED APPLICATION

This application claims priority of the filing date of Provisional Application Ser. No. 60/477,034, filed Jun. 5, 2003.

RIGHTS OF THE GOVERNMENT

The invention described herein may be manufactured and used by or for the Government of the United States for all governmental purposes without the payment of any royalty.

BACKGROUND OF THE INVENTION

The present invention relates to novel polyimide resins.

The cost and weight of aerospace structures can be significantly reduced by the application of high-performance polymeric composites. By replacing metallic components with composite materials, significant weight and cost savings between 25 and 30 percent can be realized. The advent of high modulus fibers and thermally stable polymers made it possible for the introduction of composites into 316° C. (600° F.) temperature regimes. To this end, researchers at NASA Lewis Research Center developed a high-temperature addition polyimide called PMR-15 (Polymerization of Monomeric Reactants, 1500 molecular weight), which, over several decades, became the high-temperature matrix resin "work horse" for the aerospace industry for composite applications in the range of 250° C. to 325° C. The reactant monomers for PMR-15 consist of the monomethyl ester of 5-norbornene 2,3-dicarboxylic acid (nadic ester, NE), the dimethyl ester of 3,3',4,4'-benzophenonetetracarboxylic acid (BTDE), and 4,4'-methylenedianiline (MDA).

However, PMR-15 contains 4,4'-methylenedianiline (MDA), a known animal carcinogen, a suspected human carcinogen, and a known kidney and liver toxin. When quantities of PMR-15 prepreg are being manufactured, or when this material is being produced into composite structures, exposure to MDA becomes a serious health hazard.

Currently, researchers at NASA-Lewis have developed a polyimide resin called AMB-21 which replaces MDA with 2,2-bis(4-[4-aminopnenoxyl]phenyl)propane (BAPP), a non-toxic, non-carcinogenic monomer. AMB-21 has further benefit in that it may be formed into composite components by using resin transfer molding (RTM). RTM fabrication techniques fall into the category of "low-cost" composite processing, since RTM can cut the manufacturing costs by up to 50%. Unfortunately, AMB-21 has a glass transition temperature (after post-cure) of only 285° C., which also falls short of the PMR-15 goal to achieve a 316° C. composite use-temperature.

Accordingly, it is an object of the present invention to provide a novel polyimide resin which overcomes many of the disadvantages of known polyimide resins.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there is provided a novel polyimide resin consisting essentially of 3,3',4,4'-benzophenonetetracarboxylic dianhydride (BTDA), 3,4,3',4'-biphenyltetracarboxylic dianhydride (BPDA), 2,2 bis (3',4'-dicarboxy phenyl) hexafluoro propane dianhydride (6FDA), 2-(3,4-dicarboxyphenyl)-1-phenylacetylene anhydride (4-PEPA) and an aromatic diamine.

DETAILED DESCRIPTION OF THE INVENTION

The resin of this invention is prepared in a suitable solvent at about 65% to 85% solids concentration, i.e., dianhydride monomers and diamine. By controlling the stoichiometric ratio of monomers (6FDA, BTDA, BPDA, 4-PEPA, and diamine) the average degree of oligomerization is limited to the range of about 2.0 to 8.0.

The polyimide system of the invention may be created in any of a number of different physical forms, as will be appreciated by one of ordinary skill. The monomeric reactant mixture is typically in solution, in which case suitable solvents and co-solvents may be used, as appropriate. For example, any alcohol or combination of alcohols may be used, with methanol being particularly advantageous. Alternatively, as understood by persons of ordinary skill, high-boiling, aprotic solvents may be beneficial when making powders. Non-limiting examples of such solvents include NMP, DMSO, m-cresol, pyridine, THF, DMF, xylene, and diglyme, with NMP being especially beneficial.

The polyimide system of the invention has many uses for the fabrication of high temperature composite components for airframe, turbine engine, missile, rocket and rocket motor applications. The technology is most useful for components that can be most effectively manufactured using a prepreg approach to composite fabrication with autoclave or press molding. The properties of the polyimide system allow thick composite parts to be fabricated at relatively low pressures. The polyimide system is also suitable for numerous automotive and industrial applications that employ prepreg-based composite manufacturing processes.

The following example illustrates the invention:

EXAMPLE 6 moles of 6FDA, 1 mole of BTDA, 1 mole of BPDA and 2 moles of 4-PEPA were added as solids to methanol in an appropriate sized reactor at 60% solids level. This system was stirred and heated to reflux, then refluxed for at least 2 hours to ensure complete conversion of the anhydride mixture to alkyl-esters. 9 moles of a 50% m-PDA and 50% p-PDA mixture was added to the reaction pot and stirred until dissolved.

This resin solution has excellent solution stability and can then be used directly to coat a fabric or fiber reinforcement to make a "prepreg" used to manufacture composites. The resin solution can also be used directly to make a film suitable for prepregging or use an adhesive. When cured for 3 hours at 700° F., this resin solution yields a cured polymer with a glass transition temperature of approximately 370° C., exhibiting low melt viscosity relative to PMR-15. The glass transition temperature and melt viscosity can be tailored by variation of the diamine and dianhydride ratios.

The resin solution can also be further worked up through addition of fillers or by tailoring the solids level, or by The resin solution can also be heated to evaporate solvent and also cause reaction between the monomeric components to make an oligomeric polyimide resin without solvent. Such an imidized oligomeric polyimide resin can also be used to treat fiber reinforcements or it can be directly molded to produce useful articles.

Having thus described exemplary embodiments of the present invention, it should be noted by those skilled in the art that the disclosures herein are exemplary only and that alternatives, adaptations and modifications may be made within the scope of the present invention.

We claim:

1. A novel polyimide resin consisting essentially of 3,3',4,4'-benzophenonetetracarboxylic dianhydride (BTDA), 3,4,3',4'-biphenyltetracarboxylic dianhydride (BPDA), 2,2 bis (3',4'-dicarboxy phenyl) hexafluoro propane dianhydride (6FDA), 2-(3,4-dicarboxyphenyl)-1-phenylacetylene anhydride (4-PEPA) and an aromatic diamine, wherein the mole ratio of 6FDA:BTDA:BPDA:4-PEPA is 6:1:1:2 and wherein said aromatic diamine is a 1:1 mixture of m-PDA and p-PDA.

2. The resin of claim 1 wherein the average degree of oligomerization is about 2.0 to 8.0.

* * * * *